(12) United States Patent
Yamanaka et al.

(10) Patent No.: US 10,653,058 B2
(45) Date of Patent: May 19, 2020

(54) UNMANNED OPERATION VEHICLE

(71) Applicant: HONDA MOTOR CO., LTD., Tokyo (JP)

(72) Inventors: Makoto Yamanaka, Wako (JP); Yoshihisa Hirose, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/035,832

(22) Filed: Jul. 16, 2018

(65) Prior Publication Data

US 2018/0317384 A1 Nov. 8, 2018

Related U.S. Application Data

(63) Continuation of application No. PCT/JP2016/058550, filed on Mar. 17, 2016.

(51) Int. Cl.
*A01D 34/00* (2006.01)
*A01D 34/82* (2006.01)
(Continued)

(52) U.S. Cl.
CPC ......... *A01D 34/008* (2013.01); *A01D 34/001* (2013.01); *A01D 34/64* (2013.01);
(Continued)

(58) Field of Classification Search
CPC .. A01D 34/008; A01D 34/828; A01D 34/001; A01D 34/81; A01D 34/64; A01D 2101/00; G05D 1/0246; G05D 2201/0208
See application file for complete search history.

(56) References Cited

U.S. PATENT DOCUMENTS

| 5,350,033 | A | * | 9/1994 | Kraft | ................ B25J 5/007 180/167 |
| 7,894,939 | B2 | * | 2/2011 | Zini | ................ G05B 19/41895 700/245 |

(Continued)

FOREIGN PATENT DOCUMENTS

| EP | 2286653 A2 | 2/2011 |
| EP | 2515196 A2 | 10/2012 |

(Continued)

OTHER PUBLICATIONS

European Search Report issued for European Patent Application No. 16894414.8 dated Jan. 30, 2019.

(Continued)

*Primary Examiner* — Darlene P Condra
(74) *Attorney, Agent, or Firm* — Thomas | Horstemeyer, LLP

(57) ABSTRACT

An unmanned operation vehicle includes a housing, a wheel provided in the housing, and an operation unit provided under the housing. The housing includes a camera unit, a stop switch configured to stop driving of the wheel and the operation unit when actuated, and a stop switch actuating member configured to actuate the stop switch. The camera unit is arranged substantially at a center of an upper surface of the housing in a plan view, and the stop switch actuating member is arranged immediately above an upper surface of the camera unit.

6 Claims, 6 Drawing Sheets

(51) Int. Cl.
*A01D 34/64* (2006.01)
*A01D 34/81* (2006.01)
*G05D 1/02* (2020.01)
*A01D 101/00* (2006.01)

(52) U.S. Cl.
CPC ........... *A01D 34/81* (2013.01); *A01D 34/828* (2013.01); *G05D 1/0246* (2013.01); *A01D 2101/00* (2013.01); *G05D 2201/0208* (2013.01)

(56) References Cited

U.S. PATENT DOCUMENTS

| | | | | |
|---|---|---|---|---|
| 8,918,213 B2* | 12/2014 | Rosenstein | .............. | B25J 5/007 |
| | | | | 700/258 |
| 9,028,291 B2* | 5/2015 | Martino | ................. | A63H 17/00 |
| | | | | 446/431 |
| 9,423,797 B2* | 8/2016 | Lee | ....................... | G05D 1/0274 |
| 2001/0037163 A1* | 11/2001 | Allard | .................... | B25J 9/1689 |
| | | | | 700/245 |
| 2005/0167304 A1* | 8/2005 | Shimamura | ............ | G03B 17/08 |
| | | | | 206/316.2 |
| 2012/0185095 A1 | 7/2012 | Rosenstein et al. | | |
| 2013/0030750 A1* | 1/2013 | Kim | ....................... | G06N 3/004 |
| | | | | 702/108 |

FOREIGN PATENT DOCUMENTS

| | | |
|---|---|---|
| EP | 2816433 A2 | 12/2014 |
| JP | H09-167017 A | 6/1997 |
| JP | 2015-026247 A | 2/2015 |
| JP | 2015-222502 A | 12/2015 |
| WO | 2016003077 A1 | 1/2016 |
| WO | 2017/158796 A1 | 9/2017 |

OTHER PUBLICATIONS

Search Report dated May 17, 2016, in International Application No. PCT/JP2016/058550.

* cited by examiner

FIG. 3
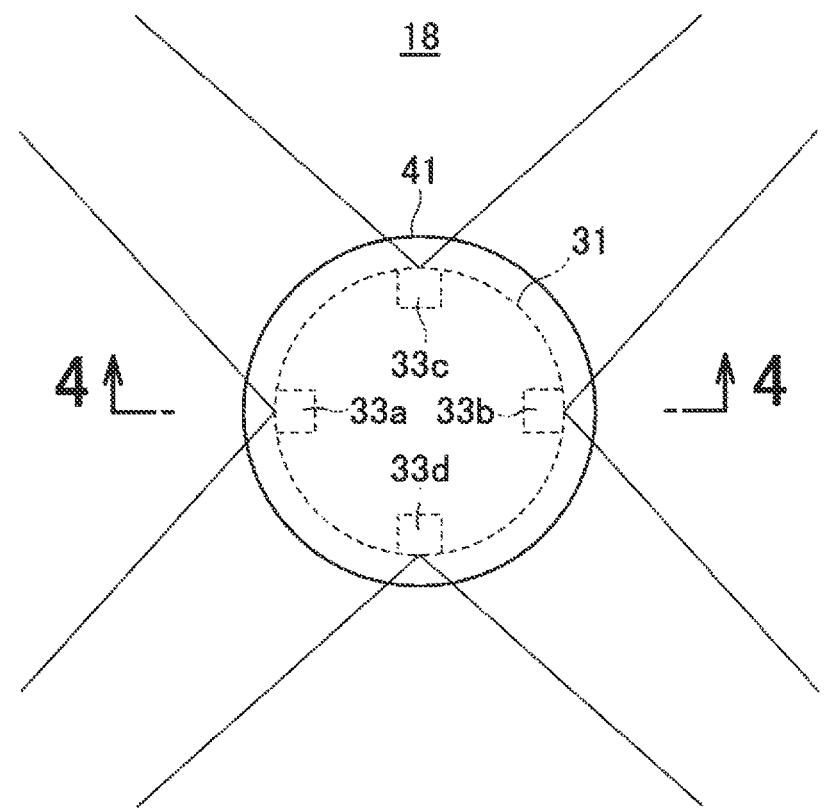
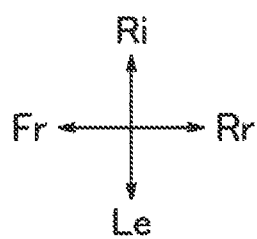

UNMANNED OPERATION VEHICLE

This application is a continuation of International Patent Application No. PCT/JP2016/058550 filed on Mar. 17, 2016 which is incorporated herein by reference.

TECHNICAL FIELD

The present invention relates to an unmanned operation vehicle. The present invention particularly relates to an unmanned operation vehicle including a camera unit and capable of capturing an image of an outside.

BACKGROUND ART

There is conventionally proposed an unmanned operation vehicle that is equipped with an operation device such as a lawn mowing blade and actuates the operation device while traveling in a set operation area without humans in attendance. For example, European Patent No. 2286653 discloses an unmanned operation vehicle with a camera at an edge portion of its housing.

The unmanned operation vehicle disclosed in European Patent No. 2286653 can capture an image of the lower side of the edge portion of the housing of the unmanned operation vehicle by the camera and determine whether the operation area included in the imaging range has already undergone the operation or not. The unmanned operation vehicle disclosed in European Patent No. 2286653 can determine, for example, whether a lawn mowing operation has already been done for the operation area included in the imaging range.

The present inventors recognized that the camera is also usable for another application purpose of, for example, determining the presence/absence of an obstacle around the unmanned operation vehicle. The present inventors recognized that if the purpose is to capture the image of the periphery of the unmanned operation vehicle, only capturing the image of the lower side of the edge portion of the housing of the unmanned operation vehicle, like the unmanned operation vehicle disclosed in European Patent No. 2286653 is insufficient.

A member that actuates a stop switch configured to forcibly stop the operation of the unmanned operation vehicle is assumed to be arranged on the upper surface of the housing of the unmanned operation vehicle. The present inventors recognized that the unmanned operation vehicle disclosed in European Patent No. 2286653 is susceptible to improvement to arrange both the camera and the member that actuates the stop switch at suitable positions.

SUMMARY OF INVENTION

An aspect of the present invention provides an unmanned operation vehicle capable of arranging both a camera unit and a stop switch operation member at suitable positions. Other aspects of the present invention will be apparent to those skilled in the art by referring to the aspects and preferred embodiments to be described below and the accompanying drawings.

The first aspect according to the present invention is directed to an unmanned operation vehicle comprising a housing, a self-propelled wheel provided in the housing, and an operation unit provided under the housing, wherein the housing includes a camera unit, a stop switch configured to stop driving of the self-propelled wheels and the operation unit when actuated, and a stop switch actuating member configured to actuate the stop switch, the camera unit is arranged substantially at a center of an upper surface of the housing in a plan view, and the stop switch actuating member is arranged immediately above an upper surface of the camera unit.

In the housing, both a suitable position to arrange the camera unit and a suitable position to arrange the stop switch actuating member are implemented. This can improve operability by a user and simultaneously raise the external detection accuracy of the unmanned operation vehicle.

According to the second aspect of the present invention, in the first aspect, the stop switch actuating member may be configured to displace in a vertical direction with respect to the camera unit, and the stop switch may be configured to be actuated according to lowering of the stop switch actuating member, and may be arranged under the camera unit or inside the camera unit.

It is possible to implement arranging the stop switch actuating member configured to actuate the stop switch immediately above the upper surface of the camera unit, and compactly provide the camera unit and the stop switch actuating member on the upper surface of the housing.

According to the third aspect of the present invention, in the first aspect, the stop switch actuating member may be provided integrally with an upper surface of the camera unit, the camera unit may be provided on the housing to displace in a vertical direction together with the stop switch actuating member, and the stop switch may be configured to be actuated according to lowering of the camera unit, and may be arranged under the camera unit.

It is possible to implement arranging the stop switch actuating member configured to actuate the stop switch immediately above the upper surface of the camera unit without performing any process of, for example, forming a through hole in the camera unit, and reduce the manufacturing cost.

According to the fourth aspect of the present invention, in the first to third aspects, at least a part of an externally visible portion of the stop switch actuating member may be tinted a red-like color.

The user visually recognizes the portion tinted the red-like color, thereby readily recognizing it as a member used to stop the operation of the unmanned operation vehicle, that is, the driving of the self-propelled wheel and the operation unit.

According to the fifth aspect of the present invention, in the first to fourth aspects, when the unmanned operation vehicle is viewed from an upper side, a contour of an upper surface of the stop switch actuating member may be equal to or larger than a contour of an upper surface of the camera unit.

It is possible to reduce direct irradiation of the upper surface of the camera unit 31 with sunlight.

According to the sixth aspect of the present invention, in the first to fifth aspects, the housing may include a main body portion, and a lid portion configured to open/close an opening portion provided in the main body portion, and at least the camera unit and the stop switch actuating may be arranged on the lid portion.

At least both the camera unit and the stop switch actuating member arranged on the lid portion can be removed only by removing the lid portion, and the maintainability improves.

BRIEF DESCRIPTION OF DRAWINGS

FIG. 3 is an enlarged view of the central portion of the housing of the unmanned operation vehicle shown in FIG. 2;

DESCRIPTION OF EMBODIMENTS

Preferred embodiments to be described below are used to easily understand the present invention. Hence, those skilled in the art should remember that the present invention is not improperly limited by the embodiments to be explained below.

First Embodiment

Figure 1:
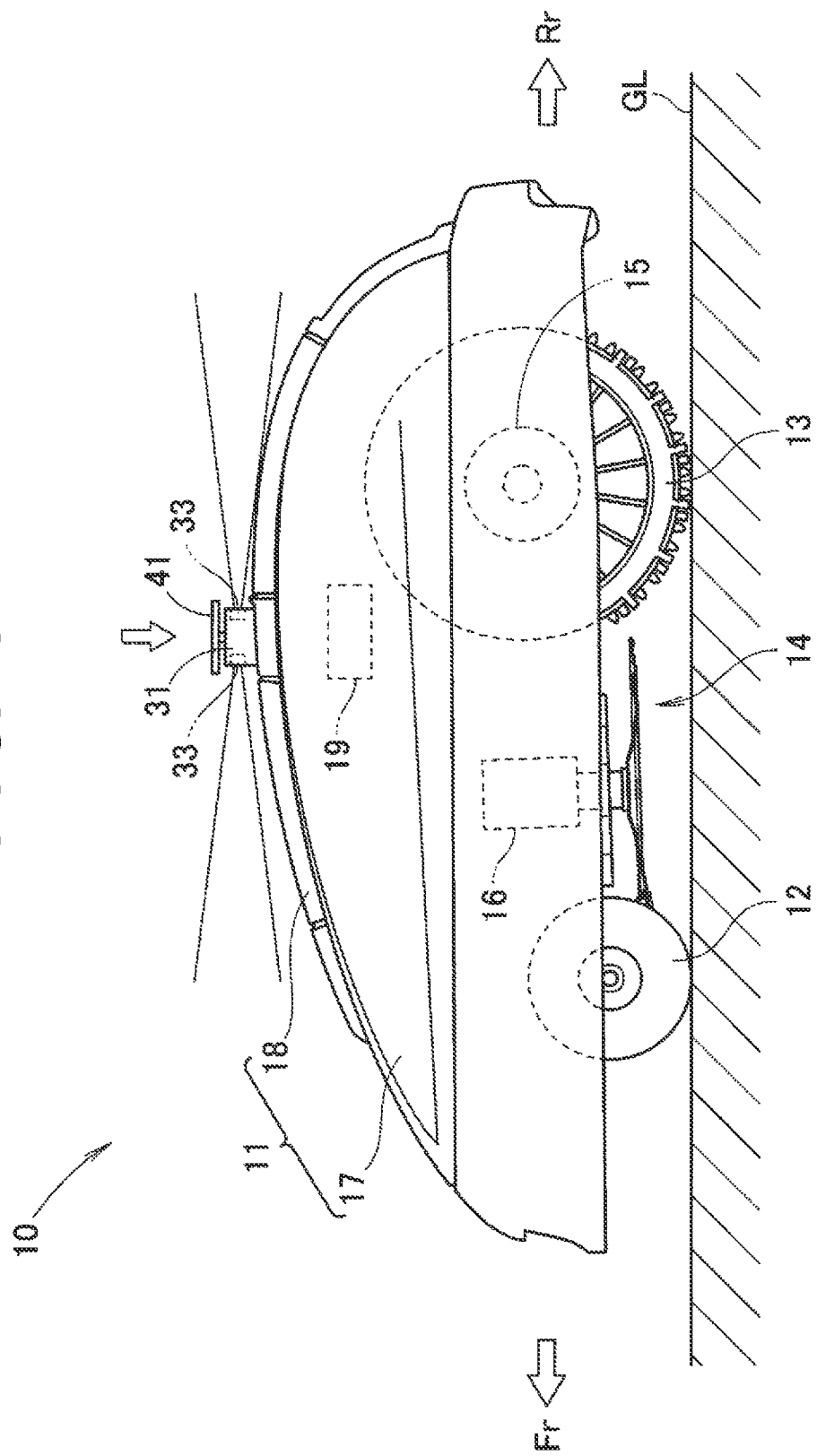
FIG. 1 is a side view of an unmanned operation vehicle according to the present invention.
Figure 2:
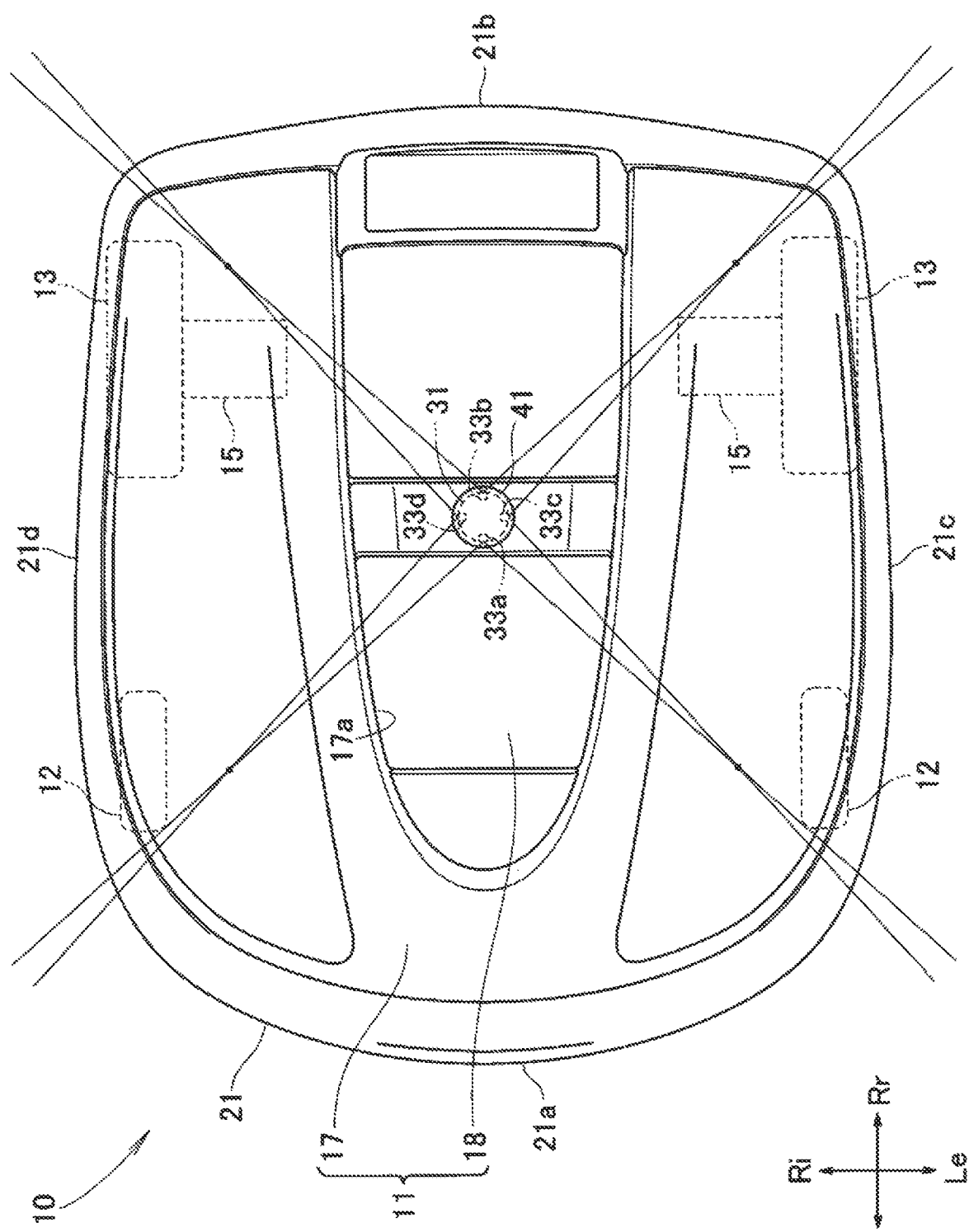
FIG. 2 is a plan view of the unmanned operation vehicle shown in FIG. 1.

As an example of an unmanned operation vehicle (to be referred to as an operation vehicle hereinafter) 10, FIGS. 1 and 2 show an unmanned lawn mower (so-called robot lawn mower) capable of autonomously traveling to mow a lawn. The operation vehicle 10 includes a housing 11, left and right front wheels 12 provided on the front side of the housing 11, left and right rear wheels 13 provided on the rear side of the housing 11, and an operation unit 14 provided on the lower side at the center of the housing 11. In the example shown in FIGS. 1 and 2, the lawn mowing blade 14 of the robot lawn mower 10 is shown as an example of the operation unit 14.

The housing 11 also serves as a bodywork. The housing 11 may include a main body portion 17, and a lid portion 18 configured to open/close an opening portion 17a provided substantially at the center of the main body portion 17 in the plan view. Alternatively, the housing 11 need not include the lid portion 18. An outer periphery 21 of the main body portion 17 of the housing 11 is formed into a substantially rectangular shape formed by a front edge 21a, a rear edge 21b, a left edge 21c, and a right edge 21d in the plan view. The housing 11 is formed to be highest near the substantially center in the plan view.

The lid portion 18 may have one end configured to engage with the end of the main body portion 17 on the side of the opening portion 17a, thereby vertically pivot about the engaging portion and opening/closing the opening portion 17a of the main body portion 17. Alternatively, the lid portion 18 may be configured to be detachable from the main body portion 17, thereby opening/closing the opening portion 17a of the main body portion 17.

The left and right rear wheels 13 are individually driven by left and right drive motors 15. The operation unit 14 is driven by an operation unit drive motor 16. The left and right drive motors 15 and the operation unit drive motor 16 are a kind of power sources mounted in the housing 11.

The operation vehicle 10 also includes a control unit 19 that automatically controls the left and right drive motors 15 and the operation unit drive motor 16 based on detection signals from various kinds of detection sensors (not shown) and/or an image captured by a camera unit 31 (to be described later). The various kinds of detection sensors (not shown) are, for example, an obstacle detection sensor, an angular velocity sensor, and an acceleration sensor. When the left and right drive motors 15 rotate forward with the same speed or rotate backward with the same speed, the operation vehicle 10 drives straight ahead in the front-and-rear direction. When only one of the left and right drive motors 15 rotates backward, the operation vehicle 10 turns.

The housing 11 has one camera unit 31 capable of capturing an image of the outside of the operation vehicle 10, which is arranged substantially at the center of the upper surface of the housing 11 in the plan view. If the housing 11 includes the lid portion 18, the camera unit 31 is arranged substantially at the center of the upper surface of the lid portion 18 in the plan view. A stop switch actuating member 41 configured to actuate a stop switch 51 is arranged immediately above the upper surface of the camera unit 31.

As will be described below, on the housing 11, both the suitable position to arrange the camera unit 31 and the suitable position to arrange the stop switch actuating member 41 are set substantially at the center of the upper surface of the housing 11 in the plan view. In the operation vehicle 10, the stop switch actuating member 41 is arranged immediately above the upper surface of the camera unit 31, thereby arranging both the camera unit 31 and the stop switch actuating member 41 at the suitable positions on the housing 11.

The reason why it is suitable to arrange the stop switch actuating member 41 substantially at the center of the upper surface of the housing 11 in the plan view will be described first. The stop switch 51 is configured to directly or indirectly stop driving of the left and right drive motors 15 and the operation unit drive motor 16 when actuated by the stop switch actuating member 41. The stop switch 51 may be configured to, for example, forcibly cut off power supplied from a battery (not shown) to the left and right drive motors 15 and the operation unit drive motor 16 when actuated by the stop switch actuating member 41. In this case, the driving of the left and right drive motors 15 and the operation unit drive motor 16 for which the power supply from the battery (not shown) stops. The stop switch 51 may be configured to, for example, output a predetermined signal to the control unit 19 when actuated by the stop switch actuating member 41. In this case, the control unit 19 that receives the signal stops the driving of the left and right drive motors 15 and the operation unit drive motor 16.

When the user applies, to the stop switch actuating member 41, an operation of, for example, pressing the stop switch actuating member 41 in the direction of an arrow shown in FIG. 1, the stop switch actuating member 41 actuates the stop switch 51. Hence, the stop switch actuating member 41 is preferably arranged at a position where the user readily applies the operation of pressing or the like to it on the housing 11. On the housing 11, the position where the user readily applies the operation of pressing or the like is the position near the substantially center of the housing 11 in the plan view where the housing 11 is highest, as shown in FIG. 1. In addition, when the stop switch actuating member 41 is arranged near the substantially center of the housing 11 in the plan view where the housing 11 is highest, the user readily visually recognizes the stop switch actuating member 41. That is, the operability of the stop switch actuating member 41 by the user rises.

The reason why it is suitable to arrange the camera unit 31 substantially at the center of the upper surface of the housing 11 in the plan view will be described next. The camera unit 31 has one or a plurality of cameras 33 on the outer periphery of the camera unit 31. In the example shown in FIG. 2, the camera unit 31 includes four cameras 33, that is, a front camera 33a that captures an image on the front side of the operation vehicle 10, a rear camera 33b that captures an image on the rear side of the operation vehicle 10, a left camera 33c that captures an image on the left side of the operation vehicle 10, and a right camera 33d that captures an image on the right side of the operation vehicle 10. In the example shown in FIG. 2, the limiting lines of the imaging ranges of the cameras 33, which schematically represent the angles of view of the cameras 33, extend from the cameras 33 so as to facilitate an explanation of blind spots of the imaging ranges, that is, portions outside the imaging ranges of the cameras 33 provided in the camera unit 31.

Figure 7:
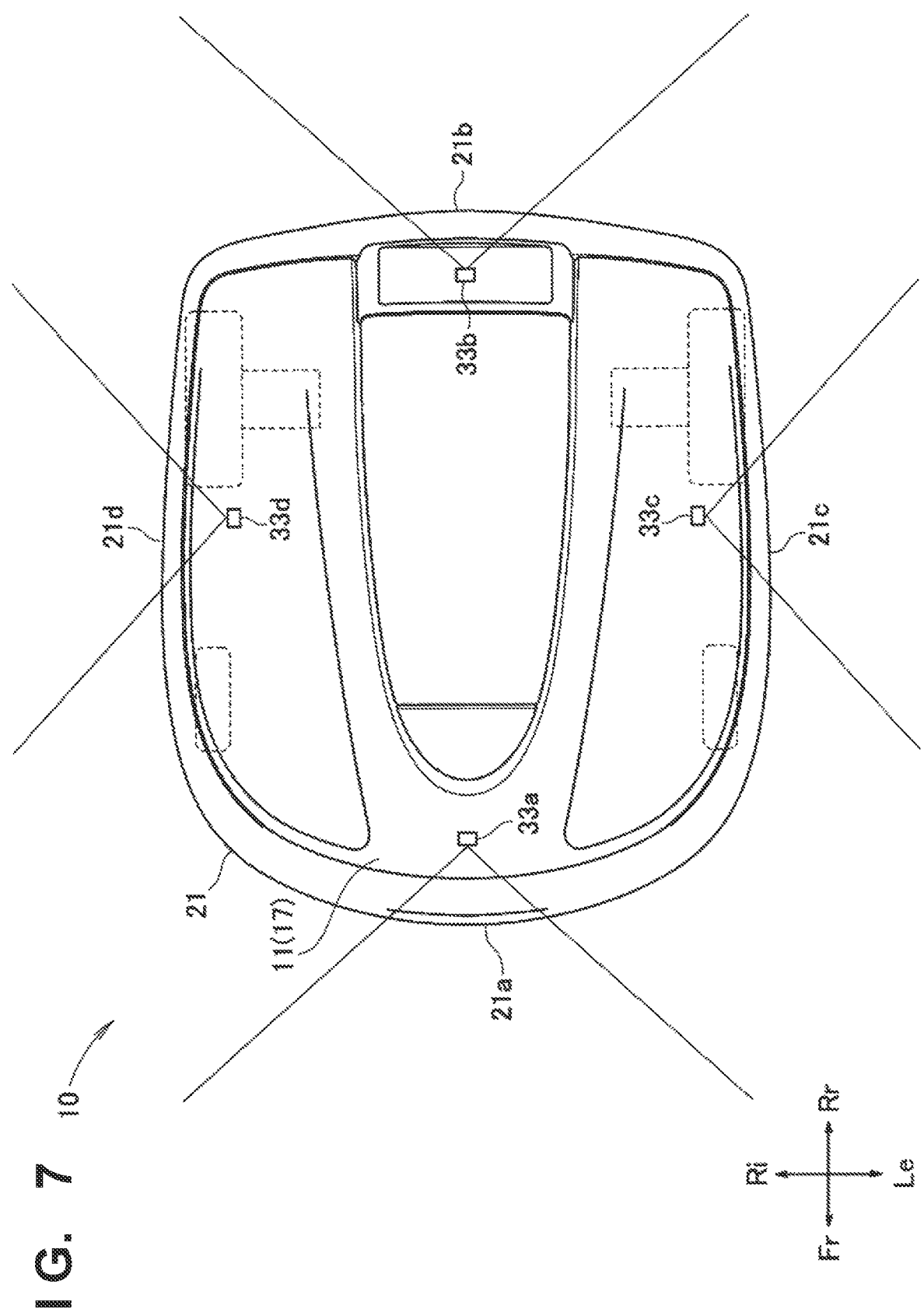
FIG. 7 is a plan view of a modification of the unmanned operation vehicle shown in FIG. 1.

FIG. 7 shows a comparative example in which the plurality of cameras 33 are directly arranged on the housing 11 without being integrated in the camera unit 31. That is, in the comparative example shown in FIG. 7, the front camera 33a is arranged on a side close to the front edge 21a of the main body portion 17 of the housing 11. The rear camera 33b is arranged on a side close to the rear edge 21b of the main body portion 17. The left camera 33c is arranged on a side close to the left edge 21c of the main body portion 17. The right camera 33d is arranged on a side close to the right edge 21d of the main body portion 17. The angle of view of each camera 33 in the comparative example shown in FIG. 7 is substantially the same as the angle of view of each camera 33 in the example shown in FIG. 2.

When FIGS. 2 and 7 are compared, the blind spots of the imaging ranges of the cameras 33 are smaller in the example shown in FIG. 2. That is, when the cameras 33 are arranged substantially at the center of the upper surface of the housing 11 in the plan view, the blind spots of the imaging ranges of the cameras 33 can be reduced without changing the number of cameras 33, the arrangement positions of the cameras 33, and the angles of view of the cameras 33, as compared to a case in which the cameras 33 are arranged at positions far from the substantially center of the upper surface of the housing 11 in the plan view. Since the upper surface of the housing 11 is highest near the substantially center of the upper surface of the housing 11, inclusion of part of the upper surface of the housing 11 in an image captured by each camera 33 is suppressed. That is, the external detection accuracy of the operation vehicle 10 improves.

As described above, on the housing 11, both the suitable position to arrange the camera unit 31 and the suitable position to arrange the stop switch actuating member 41 are substantially at the center of the upper surface of the housing 11 in the plan view.

A mention will be made of the stop switch actuating member 41. The externally visible portion of the stop switch actuating member 41, in particular, the upper surface of the stop switch actuating member 41 is preferably tinted a red-like color such as red. The user visually recognizes the portion tinted the red-like color, thereby readily recognizing it as a member used to stop the operation of the operation vehicle 10, that is, the driving of the left and right drive motors 15 and the operation unit drive motor 16.

A mention will be made of the camera unit 31. As in the example shown in FIG. 2, in at least the front half of the upper surface of the housing 11, the limiting lines of the imaging ranges of the cameras 33 adjacent to each other in the camera unit 31 viewed from the upper side preferably intersect on or inside the outer periphery 21 of the housing 11. That is, in order to implement this, the number of cameras 33, the arrangement positions of the cameras 33 on the camera unit 31, and the angles of view of the cameras 33 are preferably appropriately selected. As a result, the blind spots of the imaging ranges of the cameras 33 are eliminated at least on the front side with respect to the center of the upper surface of the housing 11, and the camera unit 31 can suitably acquire information outside the operation vehicle 10.

Additionally, as in the example shown in FIG. 2, in at least the rear half of the upper surface of the housing 11, the limiting lines of the imaging ranges of the cameras 33 adjacent to each other in the camera unit 31 viewed from the upper side preferably intersect on or inside the outer periphery 21 of the housing 11. That is, in order to implement this, the number of cameras 33, the arrangement positions of the cameras 33 on the camera unit 31, and the angles of view of the cameras 33 are preferably appropriately selected. As a result, the blind spots of the imaging ranges of the cameras 33 are eliminated on the rear side with respect to the center of the upper surface of the housing 11 as well, and the camera unit 31 can suitably acquire information outside the operation vehicle 10.

Since the outer periphery 21 of the main body portion 17 of the housing 11 is formed into a substantially rectangular shape in the plan view, the distances from the left and right corners of the outer periphery 21 on the front and rear sides to the camera unit 31 are longer than the distances from the front edge 21a, the rear edge 21b, the left edge 21c, and the right edge 21d of the outer periphery 21 to the camera unit 31. For this reason, as compared to a case in which the outer periphery 21 has, for example, a substantially perfect circle shape in the plan view, the blind spots of the imaging ranges of the cameras 33 can be reduced without changing the angles of view of the cameras 33 (the front camera 33a, the rear camera 33b, the left camera 33c, and the right camera 33d) provided in the camera unit 31 in the example shown in FIG. 2.

In the example shown in FIG. 2, the distance from the front edge 21a of the outer periphery 21 of the main body portion 17 of the housing 11 to the camera unit 31 is longer than the distance from the rear edge 21b of the outer periphery 21 to the camera unit 31. That is, the distances from the left and right corners of the outer periphery 21 on the front side (the corner between the front edge 21a and the left edge 21c and the corner between the front edge 21a and the right edge 21d) to the camera unit 31 are longer than the distances from the left and right corners on the rear side (the corner between the rear edge 21b and the left edge 21c and the corner between the rear edge 21b and the right edge 21d) to the camera unit 31. For this reason, as compared to a case in which, for example, the distance from the front edge 21a of the outer periphery 21 of the main body portion 17 of the housing 11 to the camera unit 31 is shorter than the distance from the rear edge 21b of the outer periphery 21 to the camera unit 31, the blind spots of the imaging ranges of the cameras 33 can be reduced without changing the angles of view of the front camera 33a, the left camera 33c, and the right camera 33d provided in the camera unit 31 in the example shown in FIG. 2.

As shown in FIGS. 2 and 3, when the operation vehicle 10 is viewed from the upper side, the contour of the upper surface of the stop switch actuating member 41 is preferably equal to or larger than the contour of the upper surface of the camera unit 31. When the contour of the upper surface of the stop switch actuating member 41 is equal to or larger than the contour of the upper surface of the camera unit 31, the upper surface of the stop switch actuating member 41 covers the upper surface of the camera unit 31, thereby, for example, reducing direct irradiation of the upper surface of the camera unit 31 with sunlight.

Figure 4:
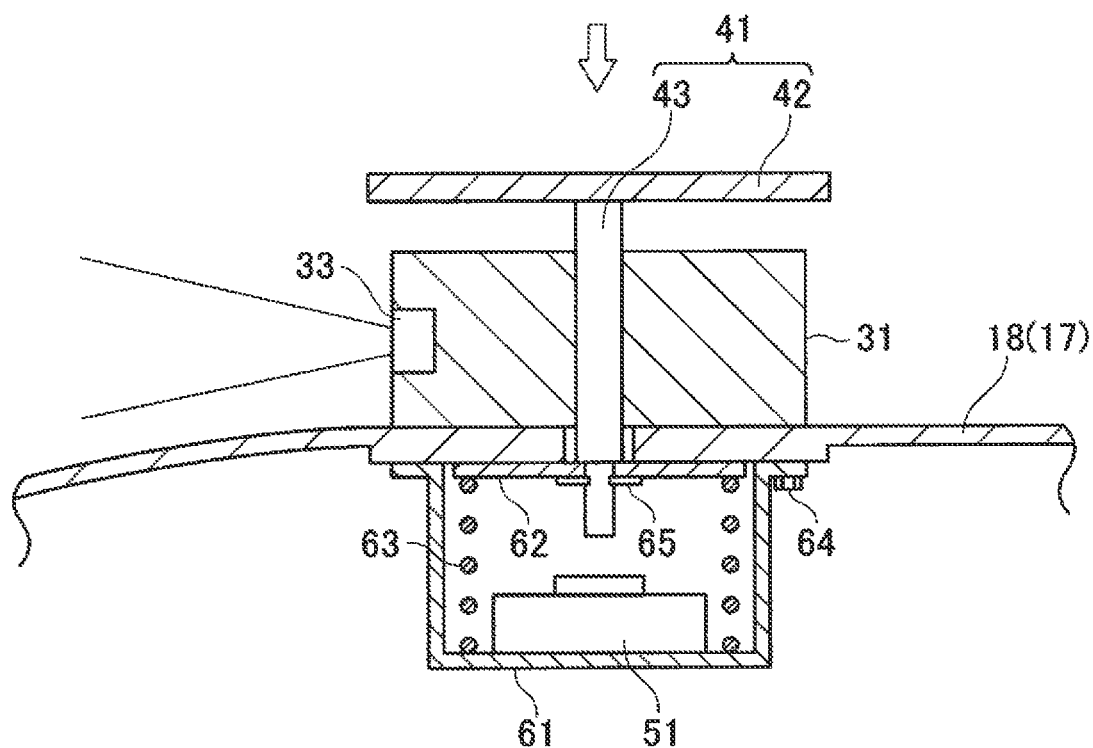
FIG. 4 is an example of a sectional view taken along a line 4-4 in FIG. 3.

An arrangement example of the camera unit 31, the stop switch actuating member 41, and the stop switch 51 to implement arranging the stop switch actuating member 41 configured to actuate the stop switch 51 immediately above the upper surface of the camera unit 31 will be described with reference to FIG. 4.

The camera unit 31 is mounted on the upper surface of the lid portion 18. A stop switch mounting case 61 used to mount the stop switch 51 is mounted, by a screw 64, on the lower surface of the lid portion 18 immediately under the camera unit 31. Of the lid portion 18, at least the portion on which the stop switch mounting case 61 is mounted is formed thick, thereby attaining reinforcement for the mounting of the stop switch mounting case 61 on the lower surface of the lid portion 18 by the screw 64.

The stop switch actuating member 41 includes an operating plate 42 that forms the upper surface of the stop switch actuating member 41, and a rod 43 extending downward from the substantially center of the operating plate 42. The operating plate 42 is arranged immediately above the upper surface of the camera unit 31. The rod 43 extends through the camera unit 31 and the lid portion 18, and the distal end of the rod 43 reaches the inside of the stop switch mounting case 61.

The stop switch mounting case 61 incorporates a spring bearing plate 62, and a coil spring 63 that biases the spring bearing plate 62 upward. A hole to make the distal end of the rod 43 extend through is formed in the spring bearing plate 62. A snap ring 65 mounted around the hole fastens the distal end of the rod 43. Hence, when the user pushes the operating plate 42 in the direction of the arrow shown in FIG. 4, the spring bearing plate 62 lowers along with the lowering of the rod 43. The spring bearing plate 62 is biased upward by the coil spring 63. Hence, when the user weakens the force of pushing the operating plate 42 in the direction of the arrow shown in FIG. 4, the spring bearing plate 62 rises until abutting against the lower surface of the lid portion 18 along with the rise of the rod 43. The stop switch actuating member 41 is configured to displace in the vertical direction with respect to the camera unit 31 in this way.

The stop switch 51 is mounted immediately under the distal end of the rod 43 on the upper surface of the bottom portion of the stop switch mounting case 61. When the rod 43 lowers by a predetermined distance or more, the stop switch 51 is actuated by the contact of the distal end of the rod 43 with the upper surface of the stop switch 51.

In the operation vehicle 10 according to the first embodiment, the general camera unit 31 with the hole to make the rod 43 extend through can be employed. That is, it is possible to implement arranging the stop switch actuating member 41 configured to actuate the stop switch 51 immediately above the upper surface of the camera unit 31 while ensuring the degree of freedom in designing the camera unit 31. In addition, the camera unit 31 and the stop switch actuating member 41 can compactly be provided on the upper surface of the housing 11.

Second Embodiment

An operation vehicle 10 according to the second embodiment is a modification of the operation vehicle 10 according to first embodiment, and a description of portions common to the operation vehicle 10 of the first embodiment will be omitted. That is, regarding the second embodiment, only an arrangement example of a camera unit 31, a stop switch actuating member 41, and a stop switch 51 to implement arranging the stop switch actuating member 41 configured to actuate the stop switch 51 immediately above the upper surface of the camera unit 31 will be described with reference to FIG. 5.

The camera unit 31 is mounted on the upper surface of a lid portion 18. The camera unit 31 also serves as the stop switch mounting case 61 used to mount the stop switch 51 in the first embodiment.

The stop switch actuating member 41 includes an operating plate 42 that forms the upper surface of the stop switch actuating member 41, and a rod 43 extending downward from the substantially center of the operating plate 42. The operating plate 42 is arranged immediately above the upper surface of the camera unit 31. The rod 43 extends through the upper surface of the camera unit 31, and the distal end of the rod 43 reaches the inside of the camera unit 31.

The camera unit 31 incorporates a spring bearing plate 62, a coil spring 63 that biases the spring bearing plate 62 upward, and a bottom plate 66 on which the stop switch 51 is mounted. A hole to make the distal end of the rod 43 extend through is formed in the spring bearing plate 62. A snap ring 65 mounted around the hole fastens the distal end of the rod 43. Hence, when the user pushes the operating plate 42 in the direction of the arrow shown in FIG. 5, the spring bearing plate 62 lowers along with the lowering of the rod 43. The spring bearing plate 62 is biased upward by the coil spring 63. Hence, when the user weakens the force of pushing the operating plate 42 in the direction of the arrow shown in FIG. 5, the spring bearing plate 62 rises until abutting against the lower portion of the upper surface of the camera unit 31 along with the rise of the rod 43. The stop switch actuating member 41 is configured to displace in the vertical direction with respect to the camera unit 31 in this way.

The stop switch 51 is mounted immediately under the distal end of the rod 43 on the upper surface of the bottom plate 66 of the camera unit 31. When the rod 43 lowers by a predetermined distance or more, the stop switch 51 is actuated by the contact of the distal end of the rod 43 with the upper surface of the stop switch 51.

In the operation vehicle 10 according to the second embodiment, the camera unit 31, the stop switch actuating member 41, and the stop switch 51 are integrated. That is, it is possible to implement arranging the stop switch actuating member 41 configured to actuate the stop switch 51 immediately above the upper surface of the camera unit 31 by a simple arrangement. In addition, the camera unit 31 and the stop switch actuating member 41 can compactly be provided on the upper surface of a housing 11.

Third Embodiment

As for an operation vehicle 10 according to the third embodiment as well, a description of portions common to the operation vehicle 10 of the first embodiment will be omitted. That is, regarding the third embodiment, only an arrangement example of a camera unit 31, a stop switch actuating member 41, and a stop switch 51 to implement arranging the stop switch actuating member 41 configured to actuate the stop switch 51 immediately above the upper surface of the camera unit 31 will be described with reference to FIG. 6.

The camera unit 31 extends through a hole formed in a lid portion 18. The lower portion of the camera unit 31 is formed into a flange shape that spreads in the horizontal direction to a size larger than the size of the hole formed in the lid portion 18.

On the upper surface of the camera unit 31, an operating plate 42 of the stop switch actuating member 41 is formed integrally with the upper surface of the camera unit 31. For example, the upper surface of the camera unit 31 may be tinted a red-like color, thereby forming the upper surface of the camera unit 31 tinted the red-like color as (the operating plate 42 of) the stop switch actuating member 41. A projecting portion 35 extending downward is formed substantially at the center of the lower portion of the camera unit 31. The projecting portion 35 serves as the rod 43 of the stop switch actuating member 41.

A stop switch mounting case 61 used to mount the stop switch 51 is mounted, by a screw 64, on the lower surface of the lid portion 18 immediately under the camera unit 31. Of the lid portion 18, the portion around the hole formed in the lid portion 18 is formed thick, thereby attaining reinforcement for the mounting of the stop switch mounting case 61 on the lower surface of the lid portion 18 by the screw 64. Note that the screw 64 mounts the stop switch mounting case 61 on the lid portion 18 outside the lower portion of the camera unit 31 formed into a flange shape.

The stop switch mounting case 61 incorporates a coil spring 63 that biases the lower surface of the camera unit 31 upward. Hence, when the user pushes the upper surface (stop switch actuating member 41) of the camera unit 31 in the direction of the arrow shown in FIG. 6, the camera unit 31 lowers. The lower surface of the camera unit 31 is biased upward by the coil spring 63. Hence, when the user weakens the force of pushing the upper surface (stop switch actuating member 41) of the camera unit 31 in the direction of the arrow shown in FIG. 6, the camera unit 31 rises until the lower portion of the camera unit 31 formed into a flange shape abuts against the lower surface of the lid portion 18. The camera unit 31 is provided on a housing 11 to displace in the vertical direction together with the stop switch actuating member 41 in this way.

The stop switch 51 is mounted immediately under the projecting portion 35 of the camera unit 31 on the upper surface of the bottom portion of the stop switch mounting case 61. When the camera unit 31 lowers by a predetermined distance or more, the stop switch 51 is actuated by the contact of the projecting portion 35 of the camera unit 31 with the upper surface of the stop switch 51.

Alternatively, the projecting portion 35 need not be formed on the lower portion of the camera unit 31. In this case, the stop switch 51 is actuated by the contact of the lower surface of the camera unit 31 with the upper surface of the stop switch 51. In the third embodiment, the upper surface of the camera unit 31 may be provided with, for example, only one 360° camera whose imaging range covers all directions around the operation vehicle 10.

In the operation vehicle 10 according to the third embodiment, the camera unit 31 itself also serves as the stop switch actuating member 41. That is, it is possible to implement arranging the stop switch actuating member 41 configured to actuate the stop switch 51 immediately above the upper surface of the camera unit 31 without performing any process of, for example, forming a through hole in the camera unit 31. As a result, the manufacturing cost is reduced.

Figure 5:
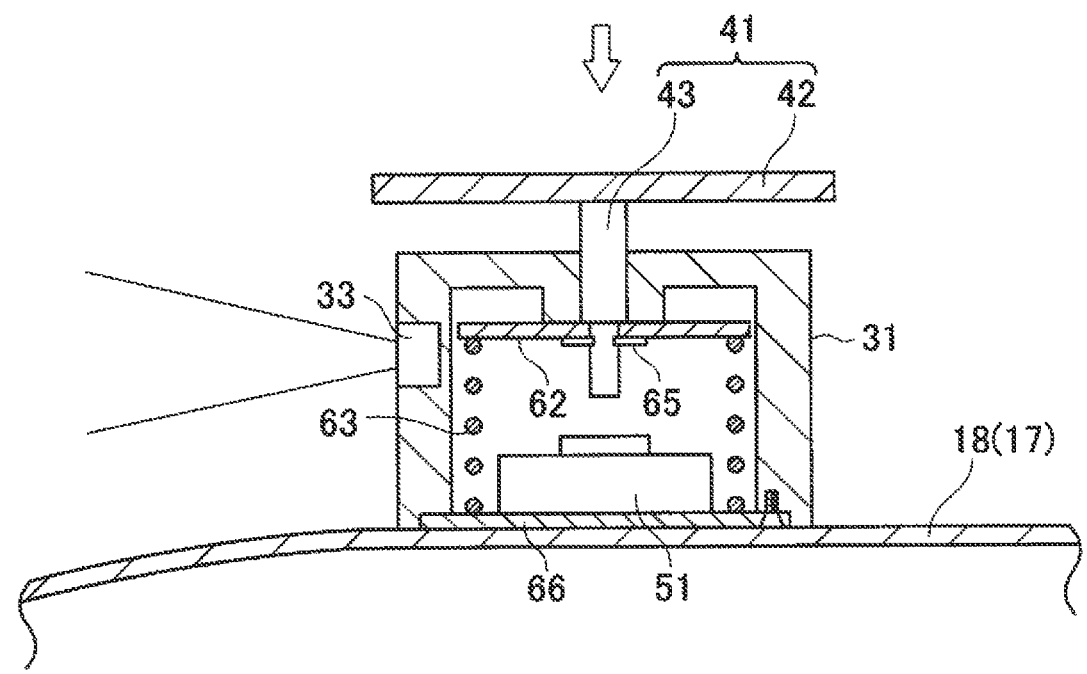
FIG. 5 is another example of the sectional view shown in FIG. 4.
Figure 6:
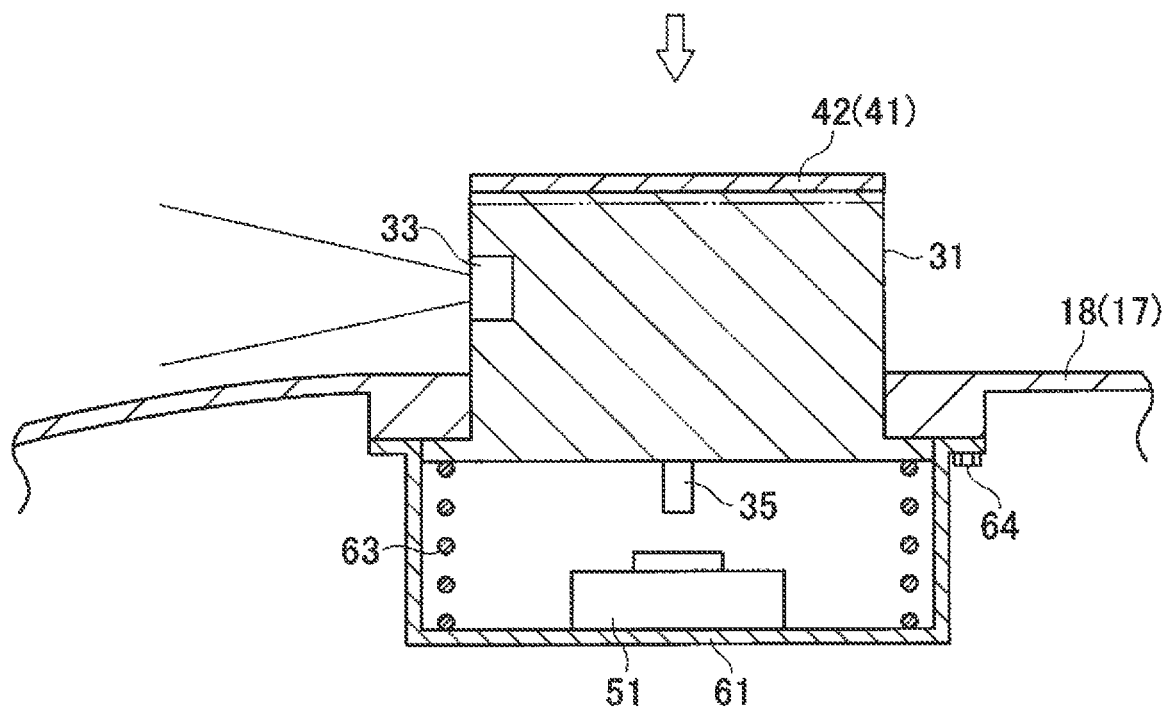
FIG. 6 is still another example of the sectional view shown in FIG. 4.

A case in which the housing 11 includes the lid portion 18 has mainly been explained with reference to FIGS. 4, 5, and 6. If the housing 11 does not include the lid portion 18, the lid portion 18 is replaced with the main body portion 17 of the housing 11. If the housing 11 includes the lid portion 18, at least both the camera unit 31 and the stop switch actuating member 41 arranged on the lid portion 18 can be removed only by removing the lid portion 18. That is, since the user need not individually remove the camera unit 31 and the stop switch actuating member 41 using, for example, a screwdriver in an exchange or inspection, the maintainability improves.

Other Embodiments

In the above-described first, second, and third embodiments, when the user pushes the stop switch actuating member 41, and the stop switch actuating member 41 (or the camera unit 31) comes into contact with the stop switch 51, the stop switch 51 is actuated. However, a cause of actuating the stop switch 51 is not limited to that the stop switch actuating member 41 (or the camera unit 31) comes into contact with the stop switch 51. For example, the stop switch actuating member 41 (or the camera unit 31) and the stop switch 51 may each have a magnet, and the stop switch 51 may be actuated according to a change in the magnetic field that occurs as they come close to each other.

The stop switch actuating member 41 (or the camera unit 31) is not limited to being configured to be able to lower. For example, the stop switch actuating member 41 may have a capacitance sensor, and the stop switch 51 may be actuated according to a change in the capacitance that occurs as the user touches the capacitance sensor. In this case, the CPU (Central Processing Unit) of the camera unit 31 or the CPU of the control unit 19 may serve as the stop switch 51.

The present invention is not limited to the above-described exemplary embodiments, and those skilled in the art can easily change the above-described exemplary embodiments within the range included in the scope of the appended claims.

INDUSTRIAL APPLICABILITY

The operation vehicle 10 according to the present invention can suitably be employed as an unmanned operation vehicle capable of autonomously traveling.

The invention claimed is:

1. An unmanned operation vehicle comprising a housing, a self-propelled wheel provided in the housing, and an operation unit provided under the housing,
    wherein the housing includes a camera unit, a stop switch configured to stop driving of the self-propelled wheel and the operation unit when actuated, and a stop switch actuating member configured to actuate the stop switch,
    the camera unit is arranged substantially at a center of an upper surface of the housing in a plan view and protrudes upward from the upper surface of the housing, and
    the stop switch actuating member is arranged immediately above an upper surface of the camera unit.

2. The unmanned operation vehicle according to claim 1, wherein the stop switch actuating member is configured to displace in a vertical direction with respect to the camera unit, and
    the stop switch is configured to be actuated according to lowering of the stop switch actuating member, and is arranged under the camera unit or inside the camera unit.

3. The unmanned operation vehicle according to claim 1, wherein
    the stop switch actuating member is provided integrally with an upper surface of the camera unit, the camera unit is provided on the housing to displace in a vertical direction together with the stop switch actuating member, and the stop switch is configured to be actuated according to lowering of the camera unit, and is arranged under the camera unit.

4. The unmanned operation vehicle according to claim 1, wherein at least a part of an externally visible portion of the stop switch actuating member is tinted a red color.

5. The unmanned operation vehicle according to claim 1, wherein when the unmanned operation vehicle is viewed from an upper side, a contour of an upper surface of the stop switch actuating member is equal to or larger than a contour of an upper surface of the camera unit.

6. The unmanned operation vehicle according to claim 1, wherein the housing includes a main body portion, and a lid portion configured to open/close an opening portion provided in the main body portion, and at least the camera unit and the stop switch actuating member are arranged on the lid portion.

\* \* \* \* \*